United States Patent
Yeom et al.

(10) Patent No.: US 7,561,376 B2
(45) Date of Patent: Jul. 14, 2009

(54) SERVO TRACK WRITER AND A CHUCK THEREOF

(75) Inventors: Ki-keon Yeom, Suwon-si (KR); Sang-jin Choi, Yongin-si (KR); Young-kun Kwon, Suwon-si (KR); Tae-hwan Kim, Suwon-Si (KR); Hyun-jin Lee, Suwion-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 698 days.

(21) Appl. No.: 10/918,392

(22) Filed: Aug. 16, 2004

(65) Prior Publication Data

US 2005/0157421 A1  Jul. 21, 2005

(30) Foreign Application Priority Data

Jan. 16, 2004  (KR) .................. 10-2004-0003347

(51) Int. Cl.
  *G11B 17/08*  (2006.01)
(52) U.S. Cl. .................................. 360/99.12
(58) Field of Classification Search .............. 360/99.12, 360/99.06, 98.08
  See application file for complete search history.

(56) References Cited

U.S. PATENT DOCUMENTS

| | | | | |
|---|---|---|---|---|
| 5,274,517 A | * | 12/1993 | Chen ........................ | 360/98.08 |
| 6,651,311 B1 | * | 11/2003 | Kim et al. ................. | 29/603.03 |
| 6,757,132 B1 | * | 6/2004 | Watson et al. ............. | 360/99.12 |
| 7,031,107 B2 | * | 4/2006 | Kim et al. ................. | 360/99.08 |
| 7,158,343 B2 | * | 1/2007 | Kim ......................... | 360/99.12 |
| 7,164,554 B2 | * | 1/2007 | Sirilutporn et al. ........ | 360/99.12 |
| 7,188,402 B2 | * | 3/2007 | Ha ........................... | 29/603.03 |
| 2005/0264927 A1 | * | 12/2005 | Lai et al. .................. | 360/98.08 |

FOREIGN PATENT DOCUMENTS

KR  2000-56740  9/2000

* cited by examiner

*Primary Examiner*—Allen T Cao
(74) *Attorney, Agent, or Firm*—Stanzione & Kim LLP

(57) ABSTRACT

A servo track writer and a chuck thereof which are capable of maintaining a central axis of a disk hub to be aligned with a rotating axis of a spindle motor adapted to rotate the disk hub, thereby preventing disks mounted on the disk hub from fluctuating. The servo track writer includes a disk hub, on which a plurality of disks are mounted, a magnetic head assembly to write servo information on the disks mounted on the disk hub, a spindle motor to rotate the disk hub, and a chuck to firmly hold the disk hub. The chuck firmly holds the disk hub at a plurality of points to prevent the central axis of the disk hub from being inclined from the rotating axis of the spindle motor.

20 Claims, 4 Drawing Sheets

SERVO TRACK WRITER AND A CHUCK THEREOF

CROSS-REFERENCE TO RELATED APPLICATIONS

This application claims the benefit of Korean Patent Application No. 2004-3347, filed on Jan. 16, 2004 in the Korean Intellectual Property Office, the disclosure of which is incorporated herein by reference.

BACKGROUND OF THE INVENTION

1. Field of the Invention

The general inventive concept of this invention relates to a servo track writer and a chuck thereof, and more particularly, to a chuck structure to fix a disk hub supporting a plurality of disks at two points spaced apart from each other by a certain distance along a central axis of the disk hub.

2. Description of the Related Art

Generally, hard disc drives are auxiliary storage devices used in computers. In such a hard disc drive, a magnetic head is arranged therein to perform operations of reading data written on a disk arranged in the hard disc drive or writing data on the disk while moving along tracks on the disk.

The disk has a plurality of concentric tracks dividing a data area of the disk in a circumferential direction of the disk, and a plurality of sectors dividing each track into a plurality of regions in a radial direction of the disk. Each track region has basic information including, for example, a track number and a sector number, that is, servo information written on a certain portion of the disk. Positioning of the magnetic head is controlled based on the servo information by determining whether or not the magnetic head is positioned at a target track region.

In order to write such servo information on a disk in a process of manufacturing a hard disk drive, a servo track writer is used. An example of a conventional servo track writer is disclosed in Korean Patent No.: 303531 or Korean Patent Publication No.: 10-2000-0056740 published on Sep. 15, 2000. The conventional servo track writer discloses a structure to perform writing of servo information on disks in an individual manner under a condition in which each disk is assembled together with a head arm to be disposed in a casing of an associated hard disk drive. For this reason, there is a limitation in productivity. For eliminating such a limitation, it is necessary to provide a servo track writer to perform writing of servo information on a plurality of disks in a simultaneous manner, prior to assembly of associated hard disk drives. In such a servo track writer, it is particularly important to maintain a central axis of a disk hub, mounted with a plurality of disks, in a state of being aligned with a rotating axis of a spindle motor adapted to rotate the disk hub without being inclined.

Magnetic heads write servo information on the disks. Each of the magnetic heads moves along an associated one of the disks to perform writing of servo information while being spaced apart from the associated disk by a small clearance of, for example, several micrometers. For this reason, the central axis of the disk hub is misaligned with the rotating axis of the spindle motor. Accordingly, there may be a problem in that the disk fluctuates during the rotation thereof so that it may strike the associated magnetic head.

SUMMARY OF THE INVENTION

In order to solve the above-mentioned and/or other problems, it is an aspect of the present general inventive concept to provide a servo track writer and a chuck thereof which are capable of maintaining a central axis of a disk hub to be aligned with a rotating axis of a spindle motor adapted to rotate the disk hub, thereby preventing disks mounted on the disk hub from fluctuating.

Additional aspects and advantages of the general inventive concept will be set forth in part in the description which follows and, in part, will be obvious from the description, or may be learned by practice of the present general inventive concept.

The foregoing and/or other aspects of the present general inventive concept may be achieved by providing a servo track writer including a disk hub on which a plurality of disks are mounted, a magnetic head assembly to write servo information on the disks mounted on the disk hub, a spindle motor to rotate the disk hub, and a chuck to firmly hold the disk hub, wherein the chuck firmly holds the disk hub at a plurality of points along a rotating axis of the spindle motor to prevent a central axis of the disk hub from being inclined with respect to the rotating axis of the spindle motor.

According to an aspect of the general inventive concept, the chuck may include a housing fixedly coupled to the spindle motor while extending upward from the spindle motor, and first and second collets slidably installed in the housing while being vertically arranged such that the second collet is closer to the spindle motor than the first collet, each of the first and second collets being vertically slidable within the housing.

According to another aspect of the general inventive concept, the chuck may further include an air chamber defined beneath the second collet to receive pressurized air adapted to generate a collet moving force to move the second collet upward, and pressure pins adapted to transmit the collet moving force from the second collet to the first collet.

According to yet another aspect of the general inventive concept, the chuck may further include a first return spring adapted to apply a resilience force to the first collet to bias the first collet to move downward, a first plate coupled to a lower end of the first collet to move together with the first collet by receiving the resilience force from the first return spring, a second returning spring adapted to apply a second resilience force to the second plate to push the second collet to move downward, and a second plate coupled to a lower end of the second collet to move together with the second collet. The second plate receives the second resilience force from the second return spring. The second return spring may have an elastic modulus smaller than that of the first return spring.

According to still another aspect of the general inventive concept, each of the first and second collets may be provided at an upper portion thereof with a slit portion divided into a plurality of sections by a plurality of slits, while being provided at an outer circumferential surface of the upper portion thereof with an outer taper surface having a diameter increasing gradually as each of the first and second collets extends upward. The housing may be provided at an upper portion thereof with a first inner taper surface corresponding to the outer taper surface of the first collet, so that the outer taper surface of the first collet is in slidable contact with the first inner taper surface of the housing. The chuck may further include an intermediate plate slidably installed in the housing between the first and second plates and having a hollow structure to allow the second collet to move vertically therethrough. The intermediate plate may be provided at an upper end thereof with a second inner taper surface corresponding to the outer taper surface of the second collet, so that the outer taper surface of the second collet is in slidable contact with the second inner taper surface of the intermediate plate.

According to another aspect of the general inventive concept, the housing may have a first step to limit an upward movement of the first plate, and a second step to limit an upward movement of the intermediate plate. The first step and first plate may be provided with spring holes adapted to receive opposite ends of the first return spring, respectively. The intermediate plate and second plate may also be provided with spring holes adapted to receive opposite ends of the second return spring, respectively. The pressure pins may be fixedly mounted to the intermediate plate to support a lower surface of the first plate.

According to yet another aspect of the general inventive concept, the chuck may further include a first O-ring to provide a seal effect between an inner circumferential surface of the housing and the second plate, and a second O-ring to provide a seal effect between the second plate and the lower end of the second collet.

According to another aspect of the general inventive concept, the disk hub may include a hub body, on which the disks are mounted, a horizontal plate provided at a lower end of the hub body and adapted to horizontally maintain the disk hub when the disk hub is engaged with the chuck, and a stem extending downwardly from a lower surface of the horizontal plate to be insertable into the chuck. The housing may have an upper flange adapted to support the lower surface of the horizontal plate so that the horizontal plate maintains the disk hub horizontally.

According to still another aspect of the general inventive concept, the housing may further have anti-vibration holes provided at a circumferential surface of the upper flange and adapted to prevent generation of vibrations caused by a non-uniform distribution of mass in the chuck about a central axis thereof, and a lower flange provided at a lower end of the housing and adapted to couple a plurality of fixing bolts thereto to fixedly couple the chuck to the spindle motor.

According to still yet another aspect of the general inventive concept, the stem may have a first engagement portion arranged adjacent to the horizontal plate and adapted to be engaged with the first collet, a second engagement portion arranged beneath the first engagement portion and adapted to be engaged with the first collet, and a stopper provided at a lower end of the second engagement portion and having an outer diameter larger than that of the second engagement portion. The stopper is adapted to be engaged with the second collet. The first collet may be provided at an upper portion thereof with first protrusions radially inwardly protruding from an inner circumferential surface of the first collet. The second collet may be provided at an upper portion thereof with second protrusions radially inwardly protruding from an inner circumferential surface of the second collet.

The foregoing and/or other aspects of the general inventive concept may also be achieved by providing a chuck used with a servo track writer having a disk hub on which at least one disk is mounted, and a spindle motor to rotate the disk hub, the chuck adapted to firmly hold the disk hub at a plurality of points so that a central axis of the disk hub is prevented from being inclined from a rotating axis of the spindle motor.

According to another aspect of the general inventive concept, the chuck may include a housing fixed to the spindle motor while extending upward from the spindle motor, and first and second collets slidably installed in the housing to be vertically arranged such that the second collet is closer to the spindle motor than the first collet, each of the first and second collets being vertically slidable.

According to yet another aspect of the invention, the first and second collets may have central axes aligned with the rotating axis of the spindle motor, respectively.

According to still another aspect of the general inventive concept, the chuck may further include an air chamber defined beneath the second collet to receive pressurized air adapted to generate a collet moving force to move the second collet upward, and pressure pins adapted to transmit the collet moving force from the second collet to the first collet.

According to another aspect of the general inventive concept, the chuck may further include a first return spring adapted to apply a resilience to the first collet to push the first collet to move downward, a first plate coupled to a lower end of the first collet to move together with the first collet, the first plate receiving the resilience from the first return spring, a second return spring adapted to apply a resilience to the second collet to push the second collet to move downward, and a second plate coupled to a lower end of the second collet to move together with the second collet. The second plate receives the resilience from the second return spring. The second return spring may have an elastic modulus smaller than that of the first return spring.

According to another aspect of the general inventive concept, each of the first and second collets may be provided at an upper portion thereof with a slit portion divided into a plurality of sections by a plurality of slits and at an outer circumferential surface of the upper portion with an outer taper surface having a diameter increasing gradually as it extends upward. The housing may be provided at an upper portion thereof with a first inner taper surface corresponding to the outer taper surface of the first collet, so that the outer taper surface of the first collet is in slidable contact with the first inner taper surface of the housing. The chuck may further include an intermediate plate slidably installed in the housing between the first and second plates and having a hollow structure to allow the second collet to move vertically therethrough. The intermediate plate may be provided at an upper end thereof with a second inner taper surface corresponding to the outer taper surface of the second collet, so that the outer taper surface of the second collet is in slidable contact with the second inner taper surface of the intermediate plate.

According to another aspect of the general inventive concept, the housing may have a first step to limit an upward movement of the first plate, and a second step to limit an upward movement of the intermediate plate. The first step and first plate may be provided with spring holes adapted to receive opposite ends of the first return spring, respectively. The intermediate plate and second plate are also provided with spring holes adapted to receive opposite ends of the second return spring, respectively. The pressure pins may be fixedly mounted to the intermediate plate to support a lower surface of the first plate.

According to another aspect of the general inventive concept, the chuck may further include a base plate to sealably close a lower end of the housing. The air chamber may be defined over the base plate.

According to another aspect of the general inventive concept, the chuck may further include a first O-ring to provide a seal effect between an inner circumferential surface of the housing and the second plate, and a second O-ring to provide a seal effect between the second plate and the lower end of the second collet.

According to another aspect of the general inventive concept, the housing may be provided with upper and lower flanges extending radially from upper and lower ends thereof, respectively. The upper flange may be provided at a circumferential surface thereof with anti-vibration holes adapted to prevent generation of vibrations caused by a non-uniform distribution of mass in the chuck about a central axis thereof. The lower flange may be provided with a plurality of bolt holes to fixedly couple the housing to the spindle motor, and an air port to supply the pressurized air into the air chamber.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
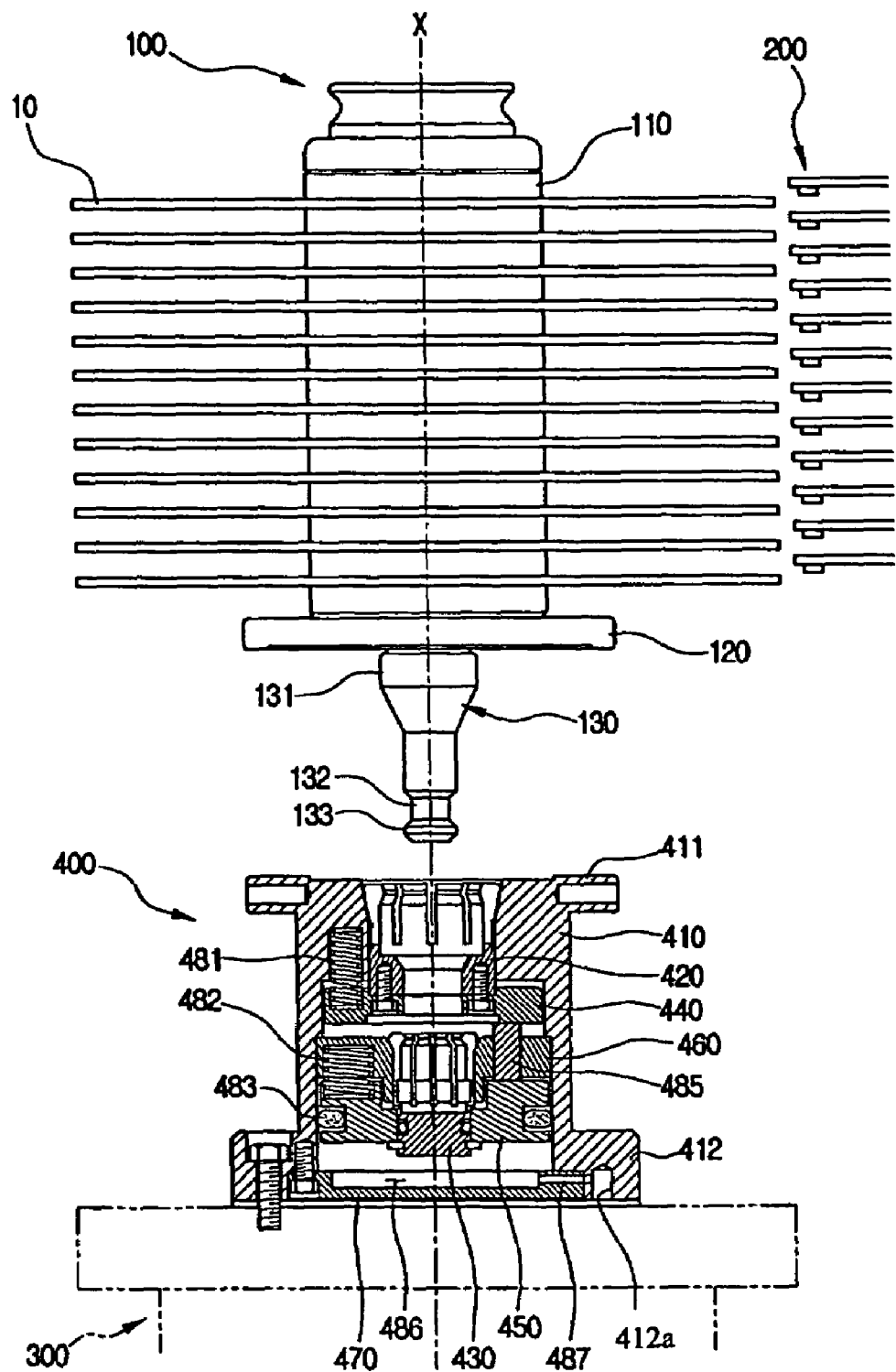
FIG. 1 is a sectional view illustrating an essential part of a servo track writer accordance with an embodiment of the present general inventive concept.

Reference will now be made in detail to the embodiments of the general inventive concept, examples of which are illustrated in the accompanying drawings, wherein like reference numerals refer to the like elements throughout. The embodiments are described below in order to explain the present invention by referring to the figures.

Figure 2:
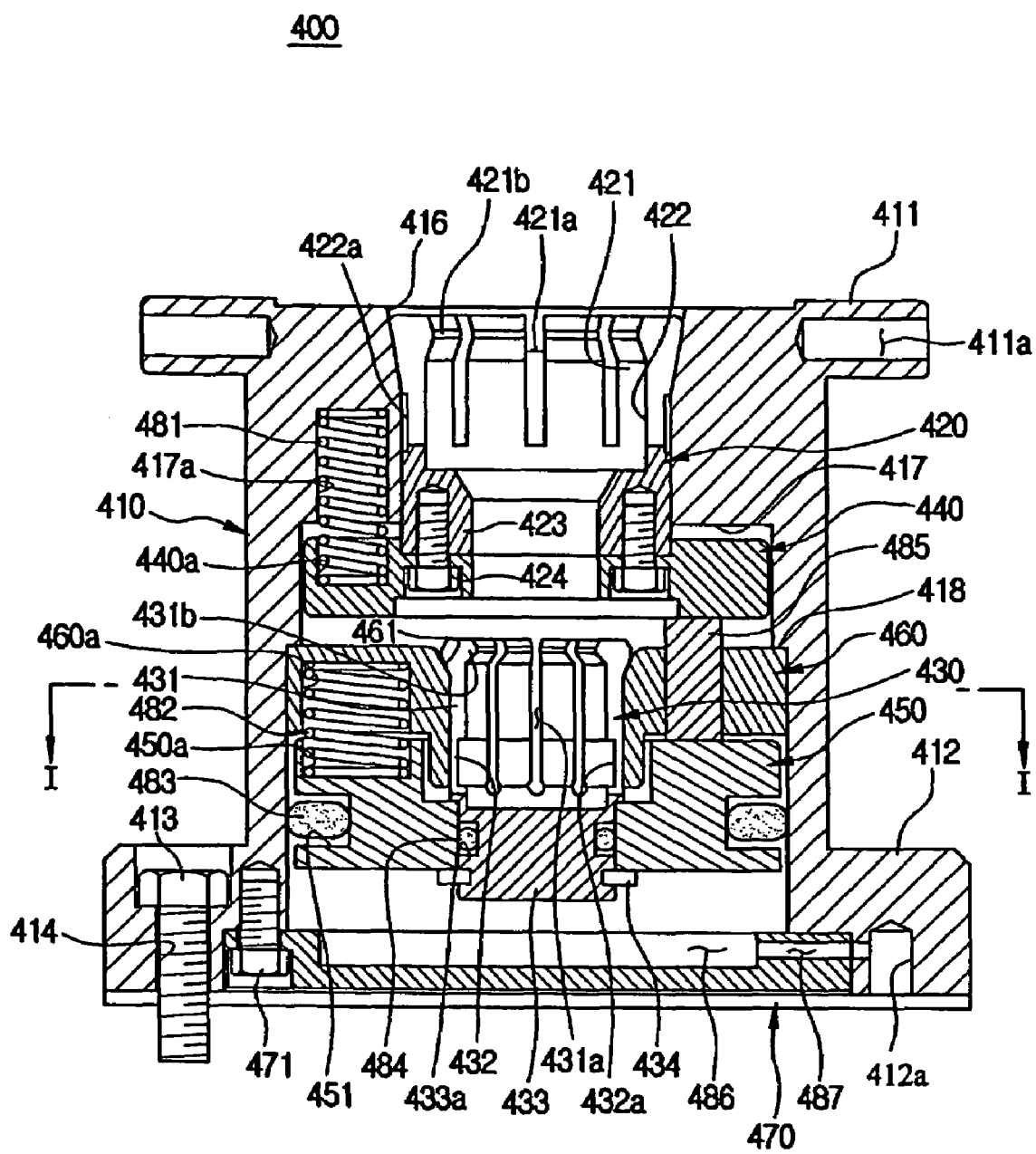
FIG. 2 is an enlarged view illustrating a chuck used with the servo track writer of FIG. 1.
Figure 3:
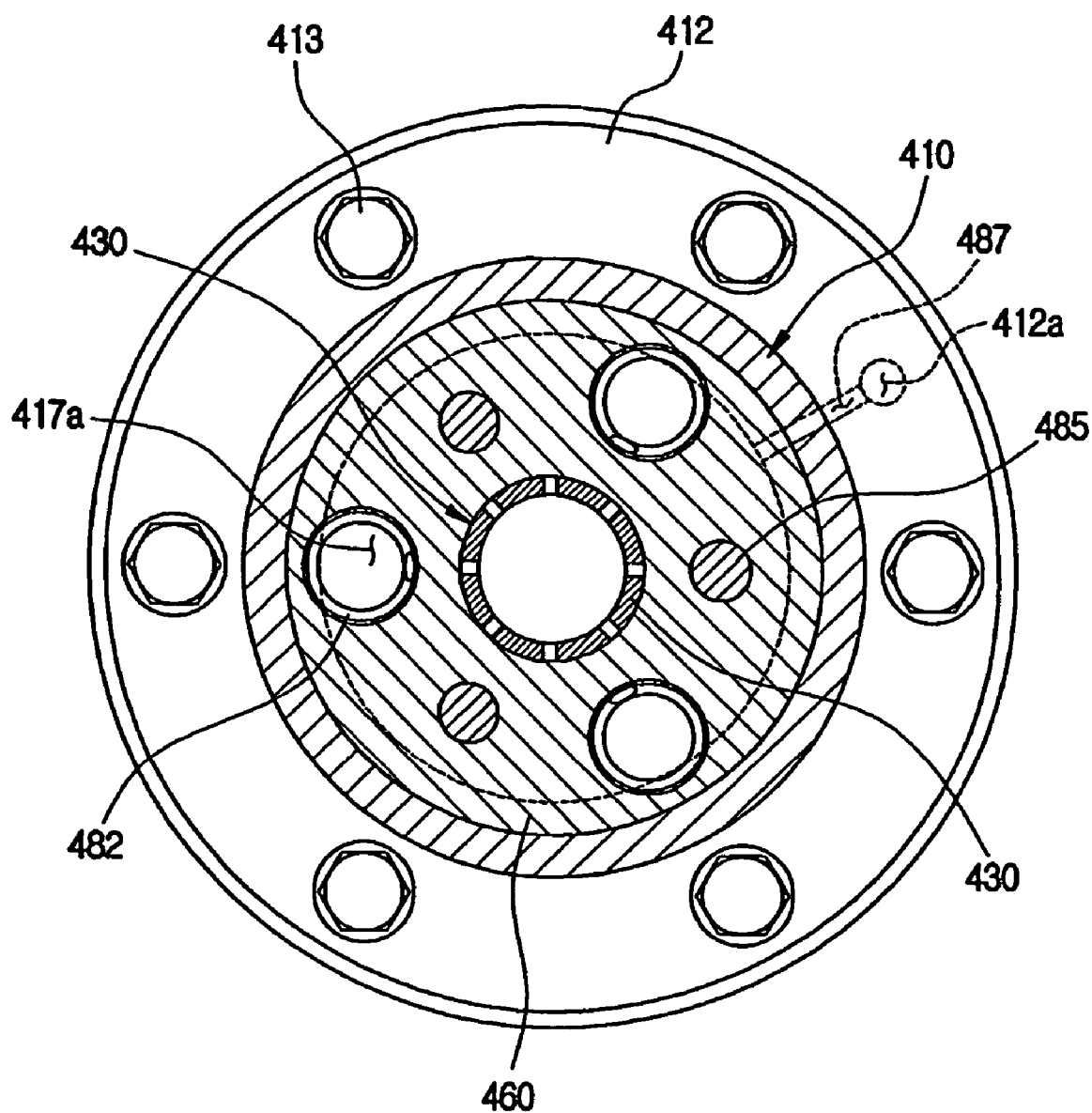
FIG. 3 is a cross-sectional view taken along the line I-I of FIG. 2.
Figure 4:
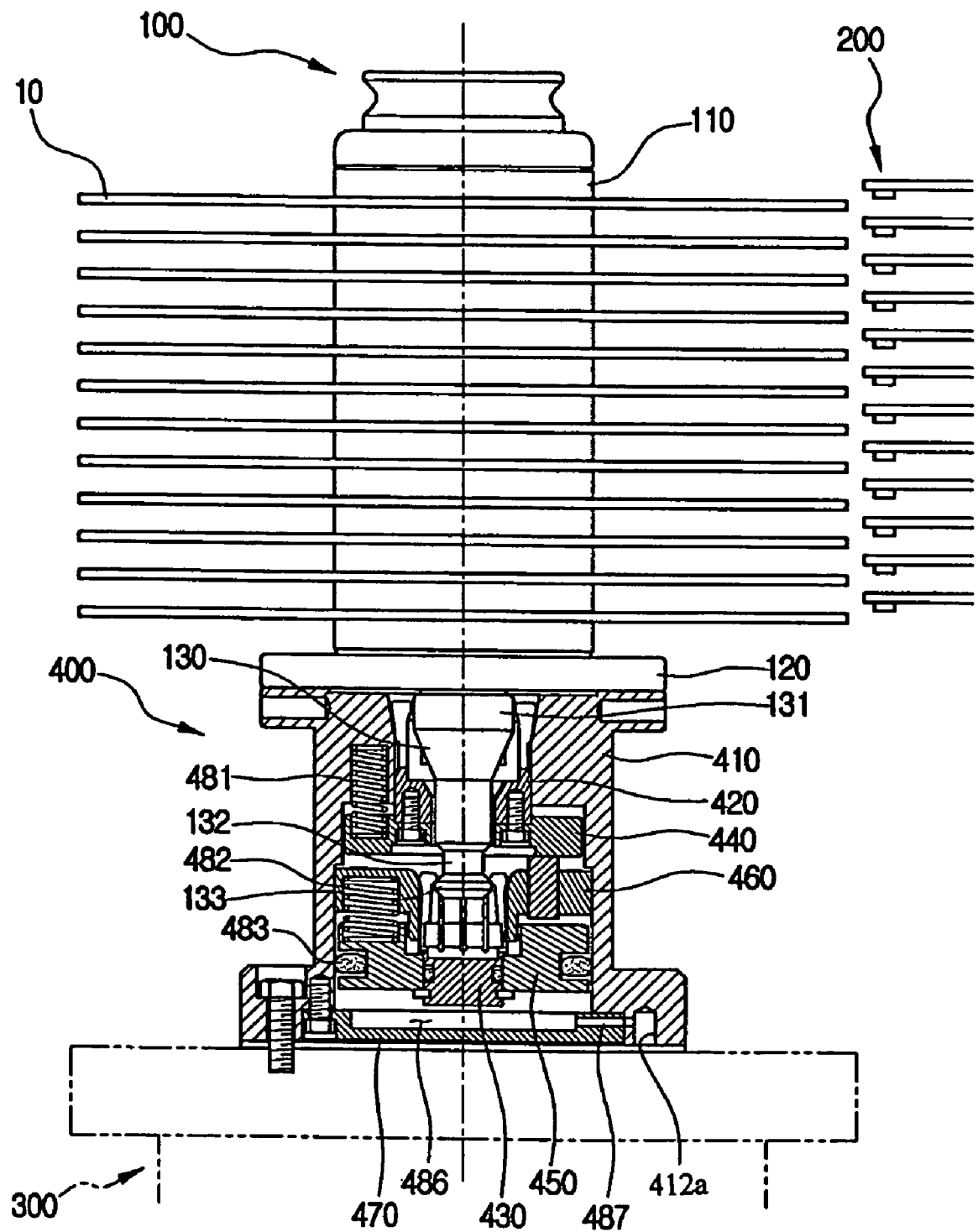
FIG. 4 is a sectional view illustrating a state in which a disk hub included in the servo track writer of FIG. 1 is fixedly coupled to the chuck.

FIG. 1 is a sectional view illustrating an essential part of a servo track writer accordance with an embodiment of the present general inventive concept. FIG. 2 is an enlarged view illustrating a chuck used with the servo track writer of FIG. 1. FIG. 3 is a cross-sectional view taken along the line I-I of FIG. 2. FIG. 4 is a sectional view illustrating a state in which a disk hub included in the servo track writer of FIG. 1 is fixedly coupled to the chuck.

As shown in FIGS. 1 to 4, the servo track writer may include a disk hub 100, on which one or more disks 10 are mounted to be uniformly spaced apart from one another while being in parallel. The servo track writer may also include a magnetic head assembly 200 including a plurality of heads each arranged to be spaced apart from an associated one of the disks 10 and adapted to write servo information on the associated disk 10, a spindle motor 300 to rotate the disk hub 100, and a chuck 400 mounted to an end of the spindle motor 300 and adapted to firmly hold the disk hub 100.

The disk hub 100 may include a hub body 110, on which the disks 10 are mounted to be uniformly spaced apart from one another, a horizontal plate 120 provided at one end of the hub body 110 and adapted to maintain the disk hub 100 at a horizontal state when the disk hub 100 is engaged with the chuck 400, and an engagement stem 130 extending from one surface of the horizontal plate 120 to be disposed away from the hub body 110 and adapted to be engaged with the chuck 130.

The chuck 400 may include a cylindrical housing 410 having a central axis aligned with a rotating axis X of the spindle motor 300, a first collet 420 fitted in the housing 410 to move upward and downward along the central axis of the housing 410, and a second collet 430 fitted in the housing 410 beneath the first collet 420. The chuck 400 may also include a first plate 440 arranged beneath the first collet 420 and coupled to a lower portion 423 of the first collet 420 to move together with the first collet 420 in an integral fashion, a second plate 450 arranged beneath the second collet 430 and coupled to a lower portion 433 of the second collet 430 to move together with the second collet 430 in an integral fashion, an intermediate plate 460 installed to be in contact with a peripheral portion of an upper end 431 of the second collet 430 to be slidable with respect to the second collet 430, and a base plate 470 mounted to a lower end of the housing 410 to sealably close the lower end of the housing 410.

The housing 410 may have a hollow structure to receive the first and second collets 420 and 430, the first and second plates 440 and 450, etc. therein. The housing 410 may be also provided at upper and lower ends thereof with radially-extending upper and lower flanges 411 and 412, respectively. The upper flange 411 may have an upper surface extending in a direction perpendicular to the central axis of the housing 410. The upper surface of the upper flange 411 can support a lower surface of the horizontal plate 120 of the disk hub 100 when the disk hub 100 is engaged with the chuck 400, so as to prevent a center axis of the disk hub 100 from being inclined with respect to the rotating axis. A plurality of radially-extending anti-vibration holes 411a can be provided at a circumferential surface of the upper flange 411. Where the mass of the chuck 400 is non-uniformly distributed around the central axis of the chuck 400, the anti-vibration holes 411a can be effectively formed to prevent vibrations from occurring during rotation of the chuck 400 due to such a non-uniform mass distribution of the chuck 400. A plurality of bolt holes 414 can be provided at the lower flange 412 to fixedly mount the chuck 400 to the spindle motor 300 using fixing bolts 413. The chuck 400 can be mounted such that its central axis is aligned with the rotating axis X of the spindle motor 300.

The first collet 420 may have a hollow structure to receive the stem 130 of the disk hub 100 therein. The first collet 420 can be provided at an upper portion thereof with a slit portion 421 divided into a plurality of sections by a plurality of vertically-extending slits 421a. An outer taper surface can be provided at an upper portion of the circumferential surface of the slit portion 421. A first inner taper surface 416 can be provided at an upper portion of the housing 410. The slit portion 421 of the first collet 420 can be in slideable contact with the first inner taper surface 416 of the housing 410. As the slit portion 421 of the first collet 420 slides along the first inner taper surface 416 of the housing 410, its inner diameter is decreased or increased, so that the slit portion 421 firmly holds the disk hub 100 or releases the disk hub 100. First protrusions 421b may radially inwardly protrude from the slit portion 421 at respective inner surfaces of the sections thereof. The first protrusions 421b can come into contact with the stem 130 of the disk hub 100 when the stem 130 is inserted into the chuck 400 for engagement of the disk hub 100 with the chuck 400. The first collet 420 may have an intermediate portion 422 provided at an outer circumferential surface thereof with an annular groove 422a. The first collet 420 may have a reduced diameter at the intermediate portion 422 thereof due to the groove 422a, so that it can be easily bent when the slit portion 421 becomes enlarged or narrowed, thereby facilitating the enlargement or narrowing of the slit portion 421. The lower portion 423 of the first collet 420 can be fixedly coupled to the first plate 440 using fixing bolts 424.

The first plate 440 may have an annular structure having an outer diameter larger than that of the first collet 420. The first plate 440 can be coupled with the first collet 420 so that they are moved in an integral fashion. A first step 417 can be also provided at an inner circumferential surface of the housing 410 in order to limit an upward movement of the first plate 440. First return springs 481 can be arranged in the housing 410 around the first collet 420 while being circumferentially spaced apart from one another with respect to the central axis of the housing 410. The first return springs 481 may serve to push the first plate 440 in a downward direction. In order to support each first return spring 481, spring holes 417a and 440a can be formed at an upper surface of the first plate 440 and the first step 417 to receive opposite ends of the first return spring 481, respectively.

The second collet 430 may have a hollow structure similar to the first collet 420 to receive the stem 130 of the disk hub 100 therein, while being provided at an upper portion thereof with a slit portion 431 divided into a plurality of sections by a plurality of vertically-extending slits 431a. With this structure, the slit portion 431 of the second collet 430 may firmly hold the disk hub 100 or release the disk hub 100 as the slit portion 431 becomes narrowed or enlarged. Second protrusions 431b may radially inwardly protrude from the slit portion 431 at respective inner surfaces of the sections thereof. The second protrusions 431b come into contact with the stem 130 of the disk hub 100 when the stem 130 is inserted into the chuck 400 for engagement of the disk hub 100 with the chuck 400. The second collet 430 may have an intermediate portion 432 provided at an outer circumferential surface thereof with an annular groove 432a. The first collet 420 may have a reduced diameter at the intermediate portion 432 thereof due to the groove 432a, so that it can be easily bent when the slit portion 431 becomes enlarged or narrowed, thereby facilitating the enlargement or narrowing of the slit portion 431. The second collet 430 may be fixedly coupled to the second plate 450 at the lower portion 433 thereof to be surrounded by the second plate 450. In order to be fixedly coupled to the second plate 450, the second collet 430 may have a reduced diameter at the lower portion 433 thereof to form a step between the intermediate and lower portions 432 and 433. The lower portion 433 of the second collet 430 can be inserted through a central hole provided at the second plate 450 such that its lower end protrudes from the second plate 450. Pins 434 can be coupled to the protruding end of the lower portion 433 of the second collet 430. Thus, the second collet 430 can be fixedly coupled to the second plate 450 by its step and pins 434.

The second plate 450 may have an annular structure so that it allows the second collet 430 to extend therethrough. The second plate 450 can move together with the second collet 430 in an integral fashion. A first O-ring 483 can be arranged between the inner circumferential surface of the housing 410 and the outer circumferential surface of the second plate 450 to provide a seal effect between the housing 410 and the second plate 450. The first O-ring 483 can be seated in a first O-ring groove 451 formed at the outer circumferential surface of the second plate 450. Similarly, a second O-ring 484 can also be arranged between the inner circumferential surface of the second plate 450 and the outer circumferential surface of the second collet 430 to provide a seal effect between the second plate 450 and the second collet 430. The second O-ring 484 is seated in a second O-ring groove 433a formed on the outer circumferential surface of the second collet 430 at the lower portion 433 thereof.

The intermediate plate 460, which surrounds the slit portion 431 of the second collet 430, may have a second inner taper surface 461 corresponding to an outer taper surface formed at the outer circumferential surface of the slit portion 431. The slit portion 431 of the second collet 430 can be in slidable contact with the second inner taper surface 461 of the intermediate plate 460. Accordingly, as the slit portion 431 of the second collet 430 slides along the second inner taper surface 461 of the intermediate plate 460, it can become enlarged or narrowed. Second return springs 482 can be arranged in the housing 410 around the second collet 430 to be circumferentially spaced apart from one another. The second return springs 482 can serve to push the second collet 430 and second plate 450 to move away from the intermediate plate 460 in a downward direction. In order to support each second return spring 482, spring holes 450a and 460a can be formed at a lower surface of the mid plate 460 and an upper surface of the second plate 450 so that they receive opposite ends of the second return spring 482, respectively. In an aspect of the general inventive concept, the second return springs 482 may have an elastic modulus smaller than that of the first return springs 481, so that the second collet 430 becomes narrow later than the first collet 420 during downward movements thereof, while becoming enlarged earlier than the first collet 420 during upward movements thereof. A plurality of pressure pins 485 can be fixedly mounted to the intermediate plate 460 while being circumferentially uniformly spaced apart from one another. The pressure pins 485 can extend vertically through the intermediate plate 460 such that they protrude beyond the upper and lower surface of the intermediate plate 460 at upper and lower ends thereof, respectively. The pressure pins 485 can serve to transmit a force between the intermediate plate 460 and the first plate 440 during upward and downward movements of the first and second collets 420 and 430. The intermediate plate 460 can be arranged in the housing 410 such that it slides upward and downward along the housing 410. In order to limit the upward movement of the intermediate plate 460, a second step 418 can be provided at the inner circumferential surface of the housing 410.

The base plate 470 can be fixedly mounted at its circumferential portion to the lower end of the housing 410 using fixing bolts 471, so that it sealably closes the lower end of the housing 410. A space can be defined in the housing 410 between the base plate 470 and the second plate 450. This space can serve as an air chamber 486, into which pressurized air will be introduced, or from which the introduced pressurized air will be vented.

The force to move the first and second collets 420 and 430, etc., upward can be generated by the pressurized air introduced into the air chamber 486. The pressurized air to be introduced into the air chamber 486 is supplied from a pressurized air supply source (not shown). The pressurized air supplied from the pressurized air supply source can be introduced into the interior of the housing 410, that is, the air chamber 486, via an air port 412a provided at one side of the lower flange 412 extending radially outwardly from the lower end of the housing 410, and an air passage 487 extending from the air port 412a to the air chamber 486 through a space defined by the lower flange 412 and base plate 470.

The first and second collets 420 and 430 can be arranged such that their central axes are aligned with the rotating axis X of the spindle motor 300, so as to control the central axis of the disk hub 100 to be aligned with the rotating axis X of the spindle motor 300 when the disk hub 100 is engaged with the chuck 400.

The stem 130 of the disk hub 100 may have a first engagement portion 131 arranged just beneath the horizontal plate 120 and adapted to engage the first collet 420 of the chuck 400, a second engagement portion 132 arranged beneath the first engagement portion 131 and adapted to engage the first collet 420, and a stopper 133 provided at a lower end of the second engagement portion 132 and having an outer diameter larger than that of the second engagement portion 132. The stopper 133 can be adapted to engage the second protrusions 431b of the second collet 430. When the second collet 430 engages the stopper 133, the second collet 430 may push the stopper 133 in a downward direction. Since the stopper 133 becomes engaged with the second collet 430 in a downwardly urged state in the above-described manner, it is possible to prevent the stem 130 from being disengaged from the chuck 400 or its central axis from being inclined with respect to the rotating axis X of the spindle motor 300 during rotation of the disk hub 100. In a state in which the disk hub 100 is mounted to the chuck 400, a circumferential portion of the lower surface of the horizontal plate 120 in the disk hub 100 is in contact with an upper surface of the upper flange 411 of the housing 410 in the chuck 400. A lower surface portion of the horizontal plate 120 at the circumferential portion thereof extends in a direction perpendicular to the central axis of the disk hub 100. In a state of being mounted to the chuck 400, the disk hub 100 can be horizontally maintained as the circumferential portion of the lower surface portion of the horizontal plate 120 is in contact with the upper surface of the upper flange 411.

In as aspect of the general inventive concept, respective central axes of the housing 410 and first and second collets 420 and 430 of the chuck 400 and the central axis of the disk hub 100 are aligned with the rotating axis X of the spindle motor 300.

Now, an operation of the servo track writer according to another embodiment of the present general inventive concept will be described.

First, a state in which the disk hub 100 is not engaged with the chuck 400 yet will be described. In this state, the first collet 420 and first plate 440 can be maintained at their lower positions using the first return spring 481. At the lower position thereof, the first plate 440 can push the pressure pins 485 downward. Accordingly, the intermediate plate 460 can be also maintained at its lower position. At the lower position of the intermediate plate 460, the second collet 430 and second plate 450 can be maintained at their lower positions using the second return spring 482. At this time, respective slit portions 421 and 431 of the first and second collets 420 and 430 can be maintained at their lower positions where they are in narrowed states, respectively. In this state, the disk hub 100 cannot be engaged with the chuck 400.

When it is desired to mount the disk hub 100 to the chuck 400 in the above state, pressurized air can be supplied from a pressurized air supply source into the air chamber 486 through the air port 412a. As the pressurized air is continuously introduced into the air chamber 486, its pressure can be exerted on the lower surfaces of the second collet 430 and second plate 450, thereby moving the second collet 430 and second plate 450 upward against the resilience of the second return spring 482. As the second collet 430 and second plate 450 move upwardly, the second return spring 482 can be contracted to push the intermediate plate 460 upward using its resilience. The upward push force applied to the intermediate plate 460 can be transmitted to the first plate 440 via the pressure pins 485, thereby causing the first collet 420 and first plate 440 to move upward while contracting the first return spring 481. At this time, the first and second collets 420 and 430 can move upward while sliding along the first and second inner taper surfaces 416 and 461 of the housing 410 and intermediate plate 460, respectively, so that their slit portions 421 and 431 become enlarged. The upward movements of the first and second collets 420 and 430 can be continued until the first plate 440 and intermediate plate 460 come into contact with the associated steps 417 and 418, respectively. After being moved to their upper positions, the first and second collets 420 and 430 can be maintained in a state capable of receiving the stem 130 of the disk hub 100 therein.

In this state, the stem 130 of the disk hub 100 may be inserted into the chuck 400 until the lower surface of the horizontal plate 120 of the disk hub 100 comes into contact with the upper flange 411 of the housing 410. Thereafter, the pressurized air, filling the air chamber 486, can be vented while the horizontal plate 120 of the disk hub 100 is supported by the upper flange 411 of the housing 410 to horizontally maintain the disk hub 100. In accordance with the ventilation of the pressurized air, the first and second collets 420 and 430 can return to their lower positions while sliding along the first and second inner taper surfaces 416 and 461 due to the resilience of the first and second return springs 481 and 482, respectively. At the lower positions thereof, the first and second collets 420 and 430 can firmly hold the stem 130 of the disk hub 100. Since the second return spring 482 has an elastic modulus smaller than that of the first return spring 481, the first collet 420 can move downward while becoming narrowed, and can be engaged with the first engagement portion 131 of the stem 130. Subsequently, the second collet 430 can be engaged with the second engagement portion 132 of the stem 130 in a manner similar to that of the first collet 420. When the first collet 420 is engaged with the first engagement portion 131, the central axis of the chuck 400 can be aligned with the central axis of the disk hub 100. Since the second collet 430 is biased downward by the second return spring 482, its second protrusions 431 can push the stopper 133 of the stem 130 downward while contacting the stopper 133. Accordingly, it is possible to prevent the stem 130 from being disengaged from the chuck 400 or its central axis from being inclined with respect to the rotating axis X of the spindle motor 300 during rotation of the disk hub 100.

Thus, the disk hub 100 is completely engaged with the chuck 400. In this state, it is possible to carry out writing of servo information on the disks 10 mounted on the disk hub 100 by rotating the spindle motor 300, and thus, the disk hub 100 can be stably supported by the chuck 400 while the magnetic head assembly 200 moves such that each head is radially moved along an associated one of the disks 10 rotating together with the disk hub 100.

When it is desired to separate the disk hub 100 from the chuck 100 after completion of the servo information writing operation, the pressurized air can be supplied into the air chamber 486 again. As a result, the first and second collets 420 and 430 can move upward to enlarge their slit portions 421 and 431, respectively, so that they release the disk hub 100. Thus, the disk hub 100 can be separable from the chuck 100.

As apparent from the above description, the general inventive concept provides a servo track writer including two collets respectively adapted to hold a stem of a disk hub at two different vertical points. In this servo track writer, it is possible to prevent a central axis of the disk hub from being inclined from a rotating shaft of a spindle motor adapted to rotate the disk hub, and thus, to prevent disks mounted on the disk hub from fluctuating.

Although a few embodiments of the general inventive concept have been shown and described, it will be appreciated by those skilled in the art that changes may be made in these embodiments without departing from the principles and spirit of the invention, the scope of which is defined in the appended claims and their equivalents.

What is claimed is:
1. A servo track writer comprising:
 a disk hub on which a plurality of disks are mounted;
 a magnetic head assembly to write servo information on the disks mounted on the disk hub;
 a spindle motor to rotate the disk hub; and a chuck to firmly hold the disk hub at a plurality of points to prevent a central axis of the disk hub from being inclined from a rotating axis of the spindle motor, wherein the chuck comprises a housing fixedly coupled to the spindle motor while extending upwardly from the spindle motor and first and second collets slidably installed in the housing.

2. The servo track writer according to claim 1, wherein the first and second collets are vertically arranged such that the second collets is closer to the spindle motor than the first collet, each of the first and second collets being vertically slidable.

3. The servo track writer according to claim 2, wherein the chuck further comprises:

an air chamber defined beneath the second collet to receive pressurized air adapted to generate a collet moving force to move the second collet upward; and pressure pins adapted to transmit the collet moving force from the second collet to the first collet.

4. The servo track writer according to claim 3, wherein the chuck further comprises:

a first return spring adapted to apply a resilience to the first collet to control the first collet to move downward;

a first plate coupled to a lower end of the first collet to move together with the first collet according to the resilience from the first return spring;

a second returning spring adapted to apply a resilience to the second collet to control the second collet to move downward; and a second plate coupled to a lower end of the second collet to move together with the second collet according to the resilience from the second return spring, wherein the second return spring has an elastic modulus smaller than that of the first return spring.

5. The servo track writer according to claim 4, wherein:

each of the first and second collets comprises at an upper portion thereof a slit portion divided into a plurality of sections by a plurality of slits, and comprises at an outer circumferential surface of the upper portion an outer taper surface having a diameter increasing gradually as the outer taper surface extends upward;

the housing comprises at an upper portion thereof a first inner taper surface corresponding to the outer taper surface of the first collet, so that the outer taper surface of the first collet is in slidable contact with the first inner taper surface of the housing; and the chuck further comprises an intermediate plate slidably installed in the housing between the first and second plates and having a hollow structure to allow the second collet to move vertically therethrough, the intermediate plate comprises at an upper end thereof a second inner taper surface corresponding to the outer taper surface of the second collet, so that the outer taper surface of the second collet is in slidable contact with the second inner taper surface of the intermediate plate.

6. The servo track writer according to claim 5, wherein:

the housing comprises a first step to limit an upward movement of the first plate, and a second step to limit an upward movement of the intermediate plate;

the first step and the first plate comprise spring holes adapted to receive opposite ends of the first return spring, respectively;

the intermediate plate and the second plate comprise spring holes adapted to receive opposite ends of the second return spring, respectively; and the pressure pins are fixedly mounted to the intermediate plate to support a lower surface of the first plate.

7. The servo track writer according to claim 6, wherein the chuck further comprises:

a first seal element to provide a seal effect between an inner circumferential surface of the housing and the second plate; and a second seal element to provide a seal effect between the second plate and the lower end of the second collet.

8. The servo track writer according to claim 2, wherein:

the disk hub comprises a hub body on which the disks are mounted, a horizontal plate provided at a lower end of the hub body and adapted to horizontally maintain the disk hub when the disk hub is engaged with the chuck, and a stem to extend downward from a lower surface of the horizontal plate to be insertable into the chuck; and the housing comprises an upper flange adapted to support the lower surface of the horizontal plate so that the horizontal plate maintains the disk hub horizontally.

9. The servo track writer according to claim 8, wherein the housing further comprises:

anti-vibration holes provided at a circumferential surface of the upper flange and adapted to prevent generation of vibrations caused by a non-uniform distribution of mass in the chuck about the central axis thereof; and a lower flange provided at a lower end of the housing, and adapted to couple a plurality of fixing bolts thereto to fixedly couple the chuck to the spindle motor.

10. The servo track writer according to claim 8, wherein:

the stem comprises a first engagement portion arranged adjacent to the horizontal plate, and adapted to be engaged with the first collet, a second engagement portion arranged beneath the first engagement portion and adapted to be engaged with the first collet, and a stopper provided at a lower end of the second engagement portion, having an outer diameter larger than that of the second engagement portion, and adapted to be engaged with the second collet;

the first collet comprises at an upper portion thereof first protrusions radially inwardly protruding from an inner circumferential surface of the first collet; and the second collet comprises at an upper portion thereof second protrusions radially inwardly protruding from an inner circumferential surface of the second collet.

11. A chuck apparatus used with a servo track writer including a disk hub, on which at least one disk is mounted, and a spindle motor to rotate the disk hub: comprising:

a chuck adapted to firmly hold the disk hub at a plurality of points so that a central axis of the disk hub is prevented from being inclined from a rotating axis of the spindle motor.

wherein the chuck comprises a housing fixedly coupled to the spindle motor while extending upward from the spindle motor and first and second collets slidably installed in the housing.

12. The chuck apparatus according to claim 11, wherein the first and second collets are vertically arranged such that the second collet is closer to the spindle motor than the first collet, each of the first and second collets being vertically slidable.

13. The chuck according to claim 12, wherein the first and second collets have central axes aligned with the rotating axis of the spindle motor, respectively.

14. The chuck according to claim 13, wherein the chuck further comprises:

an air chamber defined beneath the second collet to receive pressurized air adapted to generate a collet moving force to move the second collet upward; and pressure pins adapted to transmit the collet moving force from the second collet to the first collet.

15. The chuck according to claim 14, wherein the chuck further comprises:
a first return spring adapted to apply a resilience to the first collet to control the first collet to move downward;
a first plate coupled to a lower end of the first collet to move together with the first collet according to the resilience from the first return spring;
a second returning spring adapted to apply a resilience to the second collet to control the second collet to move downward; and
a second plate coupled to a lower end of the second collet to move together with the second collet according to the resilience from the second return spring,
wherein the second return spring has an elastic modulus smaller than that of the first return spring.

16. The chuck according to claim 15, wherein:
each of the first and second collets comprises a slit portion divided into a plurality of sections by a plurality of slits at an upper portion thereof and an outer taper surface having a diameter increasing gradually at an outer circumferential surface thereof as the outer taper surface extends upward;
the housing comprises a first inner taper surface corresponding to the outer taper surface of the first collet at an upper portion thereof, so that the outer taper surface of the first collet is in slidable contact with the first inner taper surface of the housing; and
the chuck further comprises an intermediate plate slidably installed in the housing between the first and second plates and having a hollow structure to allow the second collet to move vertically therethrough, the intermediate plate comprising a second inner taper surface corresponding to the outer taper surface of the second collet at an upper end thereof, so that the outer taper surface of the second collet is in slidable contact with the second inner taper surface of the intermediate plate.

17. The chuck according to claim 16, wherein:
the housing comprises a first step to limit an upward movement of the first plate, and a second step to limit an upward movement of the intermediate plate;
the first step and the first plate comprise spring holes adapted to receive opposite ends of the first return spring, respectively;
the intermediate plate and the second plate comprise spring holes adapted to receive opposite ends of the second return spring, respectively; and
the pressure pins are fixedly mounted to the intermediate plate to support a lower surface of the first plate.

18. The chuck according to claim 15, wherein:
the chuck further comprises a base plate to sealably close a lower end of the housing; and
the air chamber is defined over the base plate.

19. The chuck according to claim 18, wherein the chuck further comprises:
a first seal element to provide a seal effect between an inner circumferential surface of the housing and the second plate; and
a second seal element to provide a seal effect between the second plate and the lower end of the second collet.

20. The chuck according to claim 19, wherein:
the housing comprises upper and lower flanges extending radially from the upper and lower ends at upper and lower ends thereof, respectively;
the upper flange comprises anti-vibration holes formed on a circumferential surface thereof and adapted to prevent generation of vibrations caused by a non-uniform distribution of mass in the chuck about a central axis thereof; and
the lower flange comprises a plurality of bolt holes to fixedly couple the housing to the spindle motor, and an air port to supply the pressurized air into the air chamber.

* * * * *